United States Patent Office 3,406,165
Patented Oct. 15, 1968

3,406,165
MONOAZO DYESTUFFS
Winfried Kruckenberg, Leverkusen, Germany, assignor to Farbenfabriken Bayer Aktiengesellschaft, Leverkusen, Germany, a corporation of Germany
No Drawing. Filed July 9, 1963, Ser. No. 293,866
Claims priority, application Germany, July 11, 1962, F 37,285
11 Claims. (Cl. 260—207.1)

It has been found that valuable new monoazo dyestuffs are obtained by coupling diazotised 1-amino-2-cyano-4-nitrobenzene or 1-amino-2,4-dinitro-6-halobenzene or 1-amino-2-cyano-4-nitro-6-halobenzene with a coupling component of the formula

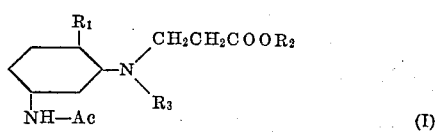
(I)

in p-position to the

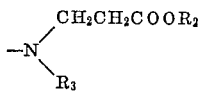

group.

In the general formula $R_1$ stands for hydrogen, halogen, alkyl or alkoxy, $R_2$ stands for a radical $-C_nH_{2n+1}$, $R_3$ represents hydrogen, $-C_nH_{2n+1}$, a cyanoethyl group or a group $-CH_2CH_2COOR_2$, $n$ is a number from 1 to 5, and Ac represents the acid radical of an optionally further substituted aliphatic carboxylic acid. The novel azo dyestuffs shall be free from sulphonic acid and carboxylic acid groups.

The coupling of the starting components proceeds in the usual way in preferably acid, aqueous or aqueous-organic medium.

Among the 1-amino-2,4-dinitro-6-halobenzenes or 1-amino-2-cyano-4-nitro-6-halobenzenes to be used as diazo components, the 6-chloro and 6-bromo compounds are preferably used. Suitable coupling components of the general Formula I are, inter alia, N-(2'-methoxy-5'-acetylaminophenyl)-β-aminopropionic acid methyl ester and -ethyl ester, N-(3'-propionylaminophenyl)-β-aminopropionic acid-methyl ester, -ethyl ester and -propyl ester, N-methyl- or N-ethyl-N-(3'-acetylaminophenyl)-β-aminopropionic acid methyl ester or -ethyl ester, N-cyanoethyl-N-(3'-acetylaminophenyl)-β-aminopropionic acid-methyl- or -ethyl ester, N-(3'-acetylaminophenyl)-N-β-carbomethoxethyl-β-aminopropionic acid methyl ester, N-(2'-methoxy - 5' - acetylaminophenyl)-N-β-carboethoxyethyl-β-aminopropionic acid ethyl ester, N-ethyl-N-(2'-ethoxy-5' - acetylaminophenyl) - β - aminopropionic acid methyl ester, N - (2'-ethoxy-5'-acetylaminophenyl)-β-aminopropionic acid methyl ester, N - (3' - chloroacetylaminophenyl)-N-methyl-β-propionic acid methyl ester, N-(3'-cyanoacetylaminophenyl) - β - aminopropionic acid ethyl ester and N-(3'-hydroxyacetylaminophenyl)-β-aminopropionic acid methyl ester, N - (3' - carbomethoxyaminophenyl)-N-ethyl-β-aminopropionic acid methyl ester and N-(3'-ureidophenyl)-β-amino-propionic acid methyl ester.

According to one variation of the process of production the new dyestuffs can also be formed by using instead of coupling components of the Formula I, with one or two $-CH_2CH_2COOR_2$ groupings, azo components which contain one or two $-CH_2CH_2COOH$ groups, and esterifying these, after completion of the coupling, with a lower aliphatic alcohol. Since this reaction is performed in general in the presence of acid catalysts, hydrolysis of the NH-Ac groups of the azo component can take place. The resulting $NH_2$ group can, however, be subsequently acylated again and converted into a NH-Ac grouping.

The new dyestuffs, which are devoid of sulphonic acid and carboxylic acid groups correspond to the general formulae

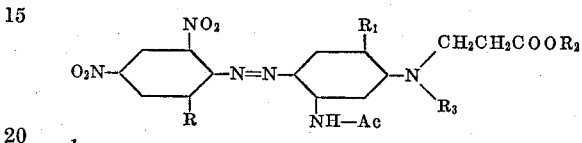

and

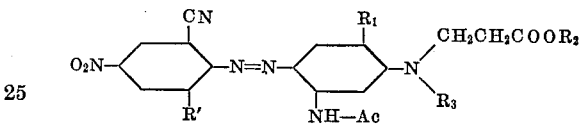

wherein R denotes a halogen atom, R' stands for hydrogen or halogen, among halogen preferably Br or Cl, and $R_1$, $R_2$, $R_3$ and Ac have the aforesaid significance are of low or no solubility in water. They are especially suitable for dyeing and printing hydrophobic materials, in particular for dyeing textile materials from aromatic polyesters, such as polyethylene terephthalates, polyamides, cellulose esters and the like. On polyethylene terephthalate fabrics, dyeings are attained with very good fastness properties, especially good fastness to light, wet processing and sublimation.

The following examples are given for the purpose of illustrating the invention.

EXAMPLE 1

26.2 grams of 2,4-dinitro-6-bromaniline are dissolved with stirring, at 0–5° C. in 200 g. of concentrated sulphuric acid, and diazotized by the addition of 17 ml. nitrosyl sulphuric acid (100 ml. correspond to 42 g. of nitrite). The diazonium salt solution is poured with stirring into a solution of 26.6 g. of the compound of the formula

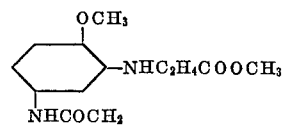

in dilute sulphuric acid and ice. It is then adjusted to pH 5.5–6 first by using a caustic soda solution and finally sodium acetate, then filtered off with suction, washed and dried.

The resulting dyestuff is a black powder, which dissolves in organic solvents with a blue colour. Brought into fine dispersion by means of suitable agents, the dyestuff dyes polyethylene terephthalate fibres in blue shades with good fastness to sublimation, washing and light.

EXAMPLE 2

26.2 grams of 2,4-dinitro-6-bromoaniline are diazotized according to the method given in Example 1. The diazonium salt solution thus obtained is combined with a solution in glacial acetic acid of a coupling component which was prepared from 27.5 grams of the compound of the formula

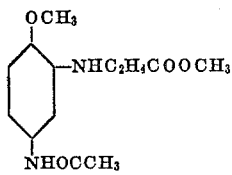

by heating with 40 g. of acrylic acid methylester and 40 g. of glacial acetic acid for 46 hours. The mixture is then poured into ice-water which contains 50 grams of sodium acetate. The reaction mixture is buffered with soda lye to pH 6. The dyestuff thus formed is filtered with suction and then dried; it represents a black powder which dyes polyethyleneterephthalate fibres the same shade as the dyestuff of Example 1; it is further distinguished by excellent drawing power.

EXAMPLE 3

A mixture of 85 grams of glacial acetic acid and 40 grams of propionic acid are allowed to run below 15° C. into 17 ml. of nitrosyl sulphuric acid (100 ml. of which correspond to 42 grams sodium nitrite). The mixture is then cooled down to —5° C. and 26.2 grams of 2,4-dinitro-6-bromoaniline added thereto at this temperature. The reaction mixture is stirred at —5° C. for further 4 hours and excess nitrite destroyed by means of urea. Into the solution of the diazonium compound thus obtained a solution in glacial acetic acid and propionic acid of a coupling component is added which was prepared by boiling 18 grams of 2-amino-4-acetylamino-1-methyloxybenzene with 18 grams of acrylic acid methylester and 5 grams of glacial acetic acid for 48 hours. The reaction mixture is then neutralized to pH 6 and the precipitated dyestuff filtered with suction and dried; it has a similar shade, similar fastness properties and an equally good drawing power as the dyestuff of Example 2.

In anologous manner the following dyestuffs are obtained from the corresponding diazo and coupling components, which dye polyethylene terephthalate fabrics in the given shades:

| | Structure | Shade |
|---|---|---|
| 4 | $O_2N$—[Br, $NO_2$]—N=N—[$OCH_3$, $NHCOCH_3$]—N($C_2H_5$)($C_2H_4COOCH_3$) | Navy blue. |
| 5 | $O_2N$—[Br, $NO_2$]—N=N—[$OCH_3$, $NHCOCH_3$]—N($C_2H_4COOCH_3$)$_2$ | Greenish blue. |
| 6 | $O_2N$—[Br, $NO_2$]—N=N—[$NHCOCH_3$]—N($C_2H_4COOCH_3$)$_2$ | Violet. |
| 7 | $O_2N$—[Br, $NO_2$]—N=N—[$OCH_2CH_3$, $NHCOCH_3$]—N(H)($C_2H_4COOCH_3$) | Greenish blue. |
| 8 | $O_2N$—[Br, $NO_2$]—N=N—[$OC_2H_5$, $NHCOCH_3$]—N($C_2H_5$)($C_2H_4COOCH_3$) | Do. |
| 9 | $O_2N$—[Br, $NO_2$]—N=N—[$OCH_3$, $NHCOCH_2OH$]—N($C_2H_5$)($C_2H_4COOCH_3$) | Do. |
| 10 | $O_2N$—[Br, $NO$]—N=N—[$OCH_3$, $NHCOCH_2OH$]—N($C_2H_4COOCH_3$)(H) | Blue. |
| 11 | $O_2N$—[Br, $NO_2$]—N=N—[$NHCOCH_2Cl$]—N($C_2H_4COOCH_3$)$_2$ | Bluish violet. |
| 12 | $O_2N$—[Br, $NO_2$]—N=N—[$OC_2H_5$, $NHCOCH_2CN$]—N($C_2H_5$)($C_2H_4COOCH_3$) | Greenish blue. |

EXAMPLE 13

10 grams of the dyestuff of the formula

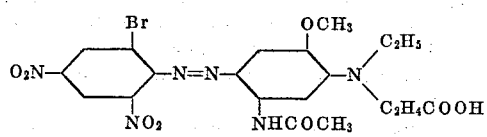

are dissolved in 150 g. of methanol. Hydrochloric acid gas is then introduced until saturation in reached followed by heating under reflux for 5 hours. The excess methanol is then distilled off, the residue diluted with 100 ml. of water and the dyestuff discharged with sodium acetate. After suction-filtration and drying the dyestuff obtained is again acetylated with acetic anhydride. The resultant dyestuff of the formula

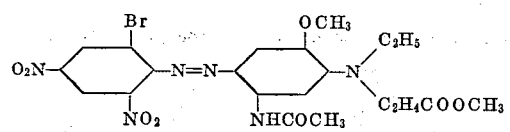

dyes polyester fibers in navy blue shades.

diazotized at 0–5° C., while stirring, by the addition of 17 ml. of nitrosyl sulphuric acid (100 ml. correspond to 42 g. of nitrite). The diazonium salt solution is poured into a solution of 26.6 g. of the compound of the formula

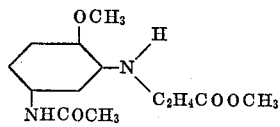

in dilute sulphuric acid and ice. The solution is then neutralised to a pH of 5.5–6 first with a caustic soda solution and then with sodium acetate, filtered off with suction, washed and dried.

The resulting dyestuff is a black powder, which dissolves in organic solvents with a blue colour. Brought into fine dispersion by means of suitable agents, the dyestuff dyes polyethylene terephthalate fibres in blue shades with good fastness to sublimation, washing and light.

In analogous manner there are obtained from the corresponding diazo and coupling components, the following dyestuffs which dye polyethylene terephthalate fabrics in the given shades:

| | | |
|---|---|---|
| 16 | $O_2N-\underset{CN}{\underset{|}{\bigcirc}}-Cl-N=N-\underset{NHCOCH_3}{\underset{|}{\bigcirc}}-OC_2H_5-HNC_2H_4COOCH_3$ | Blue. |
| 17 | $O_2N-\underset{CN}{\underset{|}{\bigcirc}}-Cl-N=N-\underset{NHCOCH_3}{\underset{|}{\bigcirc}}-OCH_3-N\begin{smallmatrix}C_2H_5\\C_2H_4COOCH_3\end{smallmatrix}$ | Greenish blue. |
| 18 | $O_2N-\underset{CN}{\underset{|}{\bigcirc}}-Cl-N=N-\underset{NHCOCH_3}{\underset{|}{\bigcirc}}-N(C_2H_4COOCH_3)_2$ | Bluish violet. |
| 19 | $O_2N-\underset{CN}{\underset{|}{\bigcirc}}-Cl-N=N-\underset{NHOCCH_3}{\underset{|}{\bigcirc}}-Cl-NHCH_2CH_2COOCH_3$ | Reddish blue. |
| 20 | $O_2N-\underset{CN}{\underset{|}{\bigcirc}}-Cl-N=N-\underset{NHOCCH_3}{\underset{|}{\bigcirc}}-CH_3-NHCH_2CH_2COOCH_3$ | Violet. |

EXAMPLE 14

100 grams of polyester fibres are dyed for one hour at 125° C. in 1000 ml. of a dyebath adjusted to a pH value of 4 to 4.5 with dilute sulphuric acid, and containing in addition to 1.5 g. of the finely dispersed dyestuff of Example 2, 3 g. of a weakly anion-active alkylphenyl polyglycol ether sulphate. The dyeing is then rinsed and, in order to improve the fastness to rubbing, treated for 20–30 minutes in about 1000 ml. of a gently boiling bath with 4 ml. of a caustic soda solution (38° Bé.), 2 g. of sodium bisulphite and 1 g. of a polyglycol ether of a fatty acid amide.

A dark blue dyeing is thus obtained with a very good fastness to sublimation.

EXAMPLE 15

19.75 g. of 2-cyano-4-nitro-6-chloroaniline are dissolved in 200 g. of concentrated sulphuric acid, and

EXAMPLE 21

100 grams of polyester fibres are dyed for one hour at 125° C. in a dyebath of 1000 ml. adjusted with dilute sulphuric acid to a pH value of 4 to 4.5 containing in addition to 1.5 g. of the finely dispersed dyestuff of Example 14, 3 grams of a weakly anion-active alkylphenyl polyglycol ether sulphate. The dyeing is then rinsed and, in order to improve the fastness to rubbing, treated for 20 to 30 minutes in about 1000 ml. of a gently boiling bath with 4 ml. of a caustic soda solution (38° B.), 2 grams of sodium bisulphite and 1 gram of a polyglycol ether of a fatty acid amide.

A blue dyeing is thus obtained with a very good fastness to sublimation.

EXAMPLE 22

19.75 grams of 2 - cyano - 4 - nitroaniline are dissolved in 200 g. of concentrated sulphuric acid and diazotized with stirring at 0 to 5° C. by adding 17 ml. of nitrosyl sulphuric acid (100 ml. of which correspond to 42 g.

of sodium nitrite). The diazonium salt solution thus obtained is poured into a solution of 26.6 grams of the coupling component of the formula

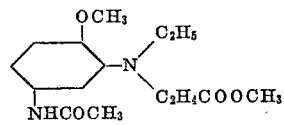

in dilute sulphuric acid and ice. The reaction mixture is then neutralized to pH 5.5–6 by adding first soda lye and subsequently sodium acetate. The precipitated dyestuff is filtered with suction, washed and dried. The dyestuff is a black powder which dissolves in organic solvents with blue colouration. If it is finely dispersed by means of suitable dispersing agents it dyes polyethyleneterephthalate fibres blue shades having good fastness to sublimation, washing and light.

The dyestuffs listed in the following table are prepared in analogous manner from the corresponding diazo and azo components; they are useful for the dyeing of hydrophobic fibre materials whereupon shades with good fastness to light wet processing are obtained; the dyestuffs yield on polyethyleneterephthalate fabrics the shades indicated below.

of Example 24, 3 g. of a weakly anion-active alkylphenyl polyglycol ether sulphate. The dyeing is then rinsed and, in order to improve the fastness to rubbing, treated for 20–30 minutes in about 1000 ml. of a gently boiling bath with 4 ml. of a caustic soda solution (38° Bé.), 2 g. of sodium bisulphite and 1 g. of a polyglycol ether of a fatty acid amide.

A dark blue dyeing is thus obtained with a very good fastness to sublimation.

I claim:
1. A compound of the formula

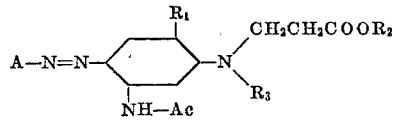

wherein:
A is a member selected from the group consisting of

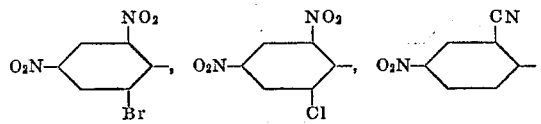

| | | Shade |
|---|---|---|
| 23 | O₂N—⟨CN⟩—N=N—⟨OC₂H₅, NHCOCH₃⟩—NHC₂H₄COOCH₃ | Reddish blue. |
| 24 | O₂N—⟨CN⟩—N=N—⟨OCH₃, NHCOCH₃⟩—N(C₂H₅)(C₂H₄COOCH₃) | Blue. |
| 25 | O₂N—⟨CN⟩—N=N—⟨NHCOCH₃⟩—N(C₂H₄COOCH₃)₂ | Bluish violet. |
| 26 | O₂N—⟨CN⟩—N=N—⟨NHCOCH₃⟩—N(C₂H₅)(C₂H₄COOCH₃) | Violet. |
| 27 | O₂N—⟨CN⟩—N=N—⟨NHCOOCH₃⟩—N(C₂H₅)(C₂H₄COOC₂H₅) | Do. |
| 28 | O₂N—⟨CN⟩—N=N—⟨NHCONH₂⟩—N(C₂H₅)(C₂H₄COOC₂H₅) | Do. |
| 29 | O₂N—⟨CN⟩—N=N—⟨NHCONHCH₃⟩—N(CH₃)(C₂H₄COOCH₃) | Do. |
| 30 | O₂N—⟨CN, NHOCCH₃⟩—N=N—⟨Cl⟩—NHCH₂CH₂COOCH₃ | Do. |
| 31 | O₂N—⟨CN, NHOCCH₃⟩—N=N—⟨CH₃⟩—NHCH₂CH₂COOCH₃ | Do. |

EXAMPLE 32

100 grams of polyester fibres are dyed for one hour at 125° C. in 1000 ml. of a dyebath adjusted to a pH value of 4 to 4.5 with dilute sulphuric acid, and containing in addition to 1.5 g. of the finely dispersed dyestuff $R_1$ is a member selected from the class consisting of hydrogen, methoxy, ethoxy and chloro;

$R_2$ is the group having the formula —$C_nH_{2n+1}$;

$R_3$ is a member selected from the class consisting of hydrogen, cyanoethyl, —$CH_2CH_2COO$—$C_nH_{2n+1}$, and —$C_nH_{2n+1}$, wherein $n$ is an integer of 1–5; and Ac is a member selected from the group consisting of unsubstituted lower aliphatic carbonyl having 2–3 carbon atoms, chloro substituted lower aliphatic carbonyl having 2–3 carbon atoms, cyano substituted lower aliphatic carbonyl having 2–3 carbon atoms, hydroxy substituted lower aliphatic carbonyl having 2–3 carbon atoms, methoxy carbonyl, amino carbonyl and methylamino carbonyl; the compound being free of sulfonic acid and carboxylic acid groups.

2.

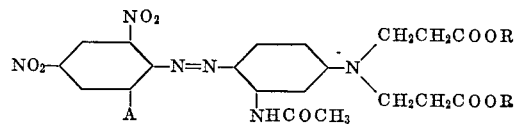

wherein A is bromine or chlorine; R is lower alkyl.

3. The dyestuff of the formula

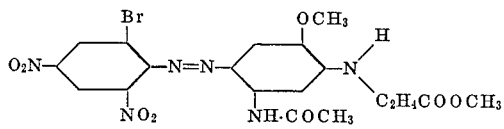

4. The dyestuff of the formula

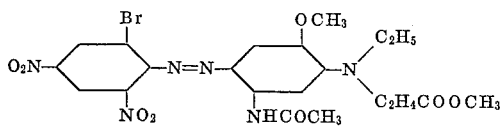

5. The dyestuff of the formula

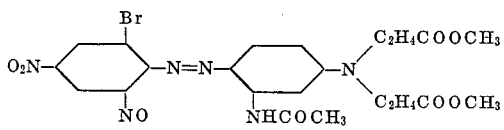

6. The dyestuff of the formula

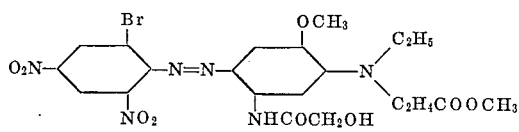

7. The dyestuff of the formula

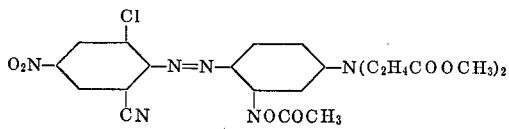

8. The dyestuff of the formula

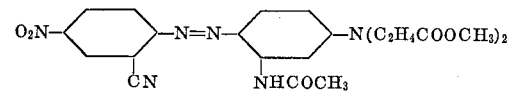

9. The dyestuff of the formula

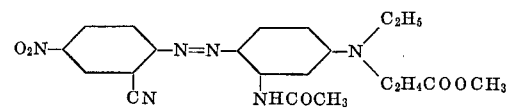

10. The dyestuff of the formula

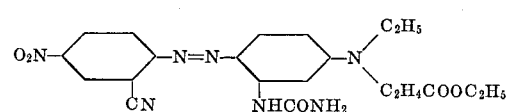

11. The dyestuff of the formula

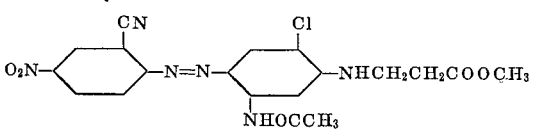

References Cited

UNITED STATES PATENTS

| | | | |
|---|---|---|---|
| 2,083,308 | 6/1937 | Senn | 260—207 |
| 2,155,755 | 4/1939 | Felix et al. | 260—207 |
| 2,283,327 | 5/1942 | Felix et al. | 260—207.1 |
| 2,349,899 | 5/1944 | Bock | 260—207.1 XR |
| 2,373,700 | 4/1945 | McNally et al. | 260—270.1 |
| 2,971,953 | 2/1961 | Rhyner | 260—207.1 |

FOREIGN PATENTS

| | | |
|---|---|---|
| 856,348 | 12/1960 | Great Britain. |
| 865,328 | 4/1961 | Great Britain. |

CHARLES B. PARKER, *Primary Examiner.*

D. M. PAPUGA, *Assistant Examiner.*

UNITED STATES PATENT OFFICE
CERTIFICATE OF CORRECTION

Patent No. 3,406,168                      October 15, 1968

Günther Schmidt

It is certified that error appears in the above identified patent and that said Letters Patent are hereby corrected as shown below:

Column 5, lines 30 to 36, the right-hand portion of the formula should appear as shown below:

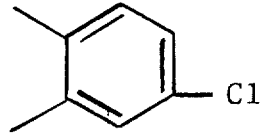

Column 9, lines 38 to 44, the formula should appear as shown below:

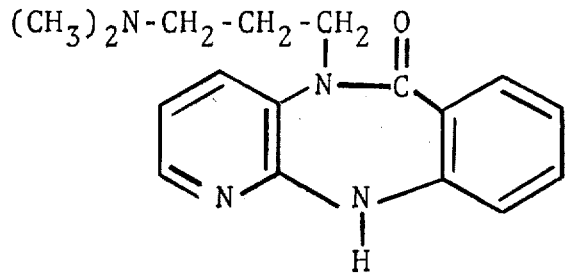

Column 12, line 32, "11β" should read -- 11H --. Column 15, line 5, "α-" should read -- β- --.

Signed and sealed this 24th day of February 1970.

(SEAL)
Attest:

EDWARD M. FLETCHER, JR.                   WILLIAM E. SCHUYLER, JR.
Attesting Officer                           Commissioner of Patents